No. 698,586. Patented Apr. 29, 1902.
J. H. THOMPSON.
CULTIVATOR AND WEED CUTTER.
(Application filed Jan. 28, 1902.)

(No Model.) 2 Sheets—Sheet 1.

Witnesses
Inventor
John H. Thompson
by
His Attorneys.

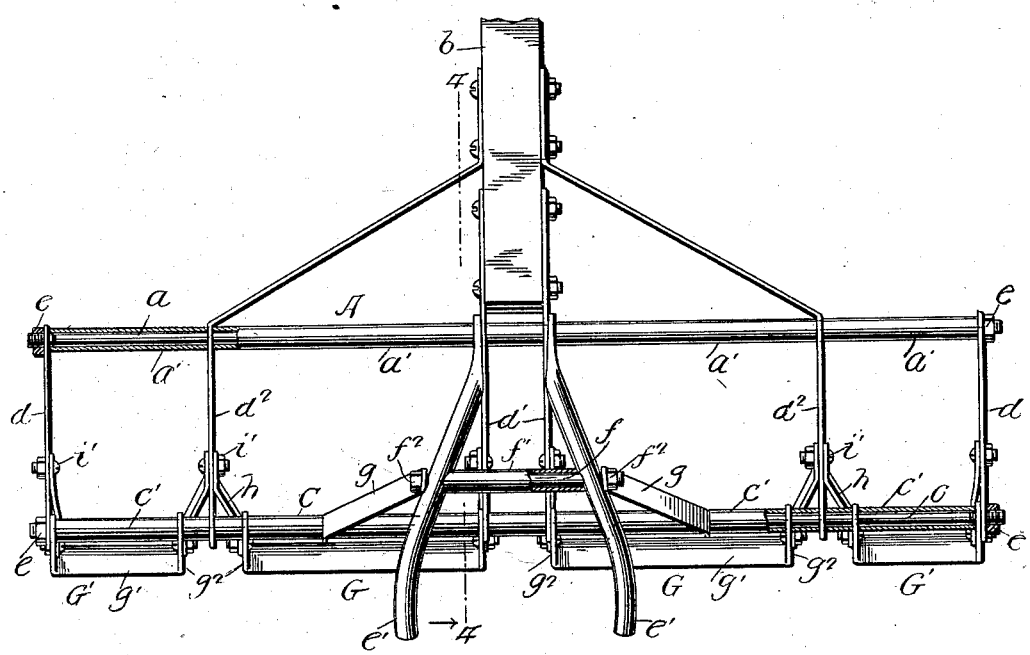
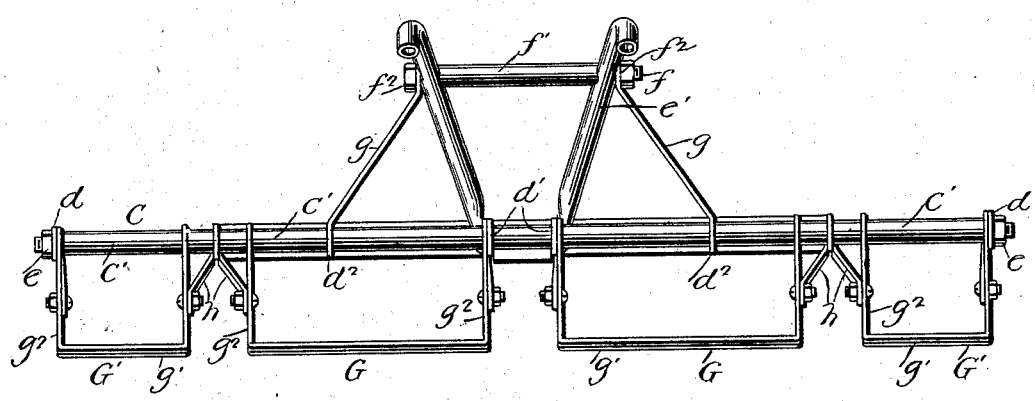

UNITED STATES PATENT OFFICE.

JOHN H. THOMPSON, OF EDNA, CALIFORNIA.

CULTIVATOR AND WEED-CUTTER.

SPECIFICATION forming part of Letters Patent No. 698,586, dated April 29, 1902.

Application filed January 28, 1902. Serial No. 91,548. (No model.)

*To all whom it may concern:*

Be it known that I, JOHN H. THOMPSON, a citizen of the United States, residing at Edna, in the county of San Luis Obispo and State of California, have invented certain new and useful Improvements in Cultivators and Weed-Cutters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention, which relates to cultivators, has for its object the production of an improved machine constructed on simple and durable lines for use in the cultivation of beets, beans, and the like and in the removal of weeds.

The nature of the invention will be readily comprehended, reference being had to the following detailed description and to the accompanying drawings, in which—

Figure 1:
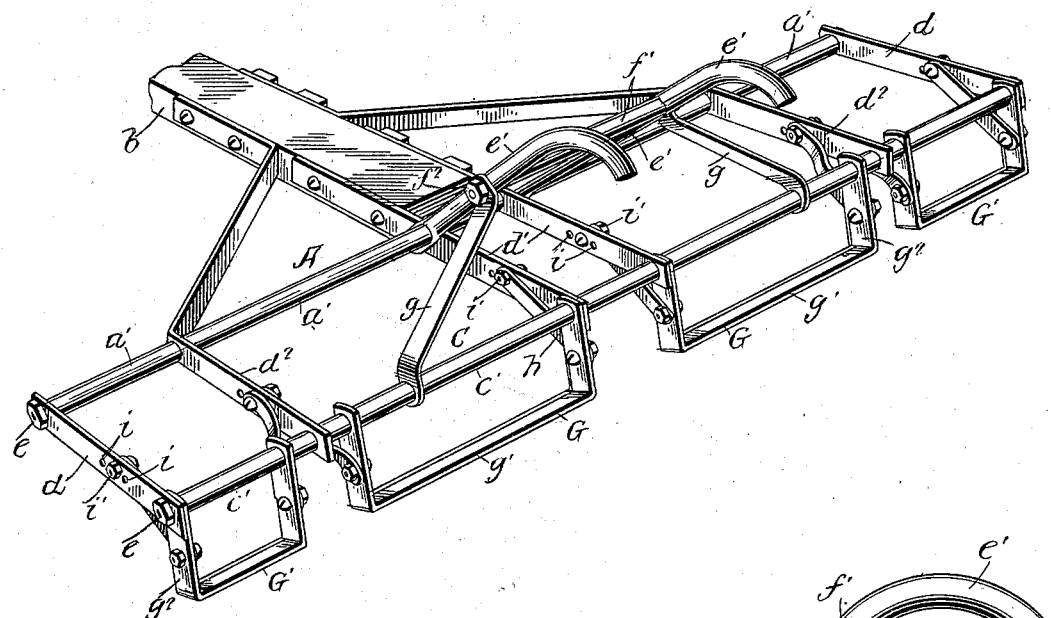
Figure 4:
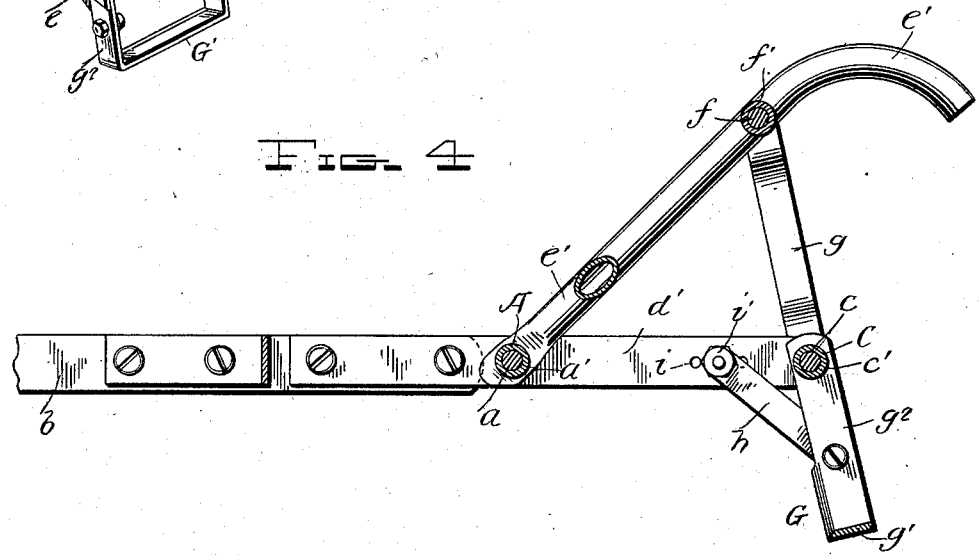

Figure 1 is a perspective view of a cultivator and weed-cutter embodying my invention. Fig. 2 is a top plan view. Fig. 3 is a rear elevation. Fig. 4 is an enlarged vertical sectional view on line 4 4 of Fig. 2.

Referring to the drawings by letter, A denotes the beam, extending forwardly of which is the tongue $b$ and to the rear of which and parallel therewith is a second beam C. The beam A is preferably constructed of a solid rod $a$ and spacing-sleeves $a'\ a'$, and the beam C is preferably also constructed of a solid rod $c$ and spacing-sleeves $c'\ c'$. The beams are rigidly connected together by bars perforated to receive the rods and held in proper relation by the spacing-sleeves. The end bars $d\ d$ are secured by nuts $e\ e$, screwed on the threaded ends of the rods.

$d'\ d'$ are the central bars, which are extended beyond the beam A to form the support for the tongue $b$.

$d^2\ d^2$ are intermediate bars extended beyond the beam A to provide braces for the tongue.

$e'\ e'$ designate handles for guiding the machine, the lower ends of which are perforated to receive the rod $a$ and which flank the bars $d'$ and the upper ends of which are connected together by a rod $f$ and sleeve $f'$ and are supported by arms $g\ g$, secured to the rod $f$ by nuts $f^2$.

The blades are supported from the rear beam C and are of approximately U form. From the cutter portion $g'$ of each blade extend upwardly supporting-arms $g^2\ g^2$, which are perforated to receive the rod $c$, and said blade is braced by arms $h\ h$, bolted to the arms $g^2$ and to the bars which connect the beams. The bars are provided with a series of holes $i\ i$, which receive the securing-bolts $i'$ of the arms $h$, whereby the blades are adjustable to vary the inclination of the cutter portions $g'$. The forward edge of each of the cutter portions, as well as the lower portions of the supporting-arms $g^2$, are beveled to provide cutting edges, the bevel of the cutter portion being preferably confined to the upper side, whereby the entrance into the ground is facilitated. Preferably the blades are adjusted to give a forward inclination to the cutter portions, as shown in Fig. 4.

The blades are spaced apart to enable the machine to straddle the rows. Obviously by the construction employed the machine may be readily adjusted to conform to the rows made by different sizes and makes of planters. The inner blades G G are each of such width as will occupy the entire space between two rows, and the outer blades G' G' are preferably of such a width as will occupy one-half of the space beyond the outer rows.

In practice, the machine being in motion, the blades enter the ground to the desired depth, loosening the earth and cutting the weeds at or near the roots. The blades by reason of their peculiar form meet with but slight resistance, the blades being presented edgewise, so that little power is required to draw the machine. The machine is very light in weight; but the construction employed possesses strength, rigidity, and durability.

By reason of the construction employed the machine may be knocked down and packed into small compass for transportation.

I claim as my invention—

1. In a machine of the class described, the combination of a beam, blades secured to the beam each blade having a flat cutter portion, arms extending from the cutter portion and secured to the beam, and brace-arms for the blades.

2. In a machine of the class described, the combination of a beam, U-shaped blades secured to the beam each having a flat cutter portion, and brace-arms adjustably connecting the blades to the frame whereby the cutter portions may assume various degrees of inclination.

3. In a machine of the class described, the combination of a forward beam, a rear beam secured to the forward beam by bars, U-shaped blades depending from the rear beam, spacing-sleeves on the beams securing the bars and blades in position, nuts on the threaded ends of the beams, and brace-arms adjustably connecting the blades to the bars.

4. In a machine of the class described, the combination of a beam, blades secured thereto, each consisting of a flat cutter portion beveled at its upper side to provide a cutting edge, and arms extending from the ends of the cutter portion said arms being beveled at their lower ends and provided at their upper ends with means for connection with the beam.

In testimony whereof I affix my signature in presence of two witnesses.

JOHN H. THOMPSON.

Witnesses:
D. M. MEREDITH,
GEO. H. THROOP.